US008443957B2

(12) United States Patent
Thériault

(10) Patent No.: US 8,443,957 B2
(45) Date of Patent: May 21, 2013

(54) PACKAGE STREAM INDEXER DEVICE

(75) Inventor: Dominic Thériault, St-Jacques (CA)

(73) Assignee: Conception Impack DTCI Inc., Saint-Jacques, Quebec (CA)

( * ) Notice: Subject to any disclaimer, the term of this patent is extended or adjusted under 35 U.S.C. 154(b) by 220 days.

(21) Appl. No.: 12/737,452

(22) PCT Filed: Jul. 14, 2009

(86) PCT No.: PCT/CA2009/001003
§ 371 (c)(1),
(2), (4) Date: Jan. 14, 2011

(87) PCT Pub. No.: WO2010/006437
PCT Pub. Date: Jan. 21, 2010

(65) Prior Publication Data
US 2011/0120837 A1 May 26, 2011

Related U.S. Application Data

(63) Continuation-in-part of application No. 12/216,942, filed on Jul. 14, 2008, now Pat. No. 7,967,124.

(51) Int. Cl.
*B65G 13/00* (2006.01)
(52) U.S. Cl.
USPC ........................ 193/35 TE; 198/787; 198/817
(58) Field of Classification Search
USPC ................ 193/35 TE; 198/626.1, 626.2, 787, 198/817, 860.5, 866
See application file for complete search history.

(56) References Cited

U.S. PATENT DOCUMENTS

| 2,307,389 | A | 4/1941 | Carter |
| 2,494,302 | A | 11/1946 | Mason |
| 2,550,201 | A | 11/1946 | Parisi |
| 6,032,781 | A | 3/2000 | Ballestrazzi et al. |
| 7,967,124 | B2 * | 6/2011 | Theriault ............ 193/35 TE |
| 2007/0158166 | A1 | 7/2007 | Vestergaard |
| 2008/0110731 | A1 | 5/2008 | Vestergaard |

FOREIGN PATENT DOCUMENTS

| CA | 2186836 A1 | 4/1997 |
| WO | WO 2005/073110 A1 | 8/2005 |
| WO | WO 2006/074659 A1 | 7/2006 |

\* cited by examiner

*Primary Examiner* — Douglas Hess
(74) *Attorney, Agent, or Firm* — IPAXIO S.E.N.C.

(57) ABSTRACT

A package stream indexer device (1) for indexing a stream (S) of packages (P) being displaced thereon within a stream plane includes first and second articulated tracks (24) with live rollers (28) and corresponding lower articulated tracks (50) with depending pressure wheels (58) for maintaining packages (P) in contact with the first and second tracks (24) and within the package path defined there between within the stream plane. Each of the first and second articulated tracks (24) along with corresponding lower track (50) are each composed of a plurality of interconnected links (26,52) frictionally engaged together to allow adjustment in track orientation from one set position to another by means of dynamic movement on the tracks (24,50). The second tracks (24) respectively register upstream arid downstream of a moveable intermediate conveyor (2') bridging an input conveyor (40) and a reception conveyor (40" or 40'''), with the respective indexing mechanisms (1', 1" or 1''').

9 Claims, 9 Drawing Sheets

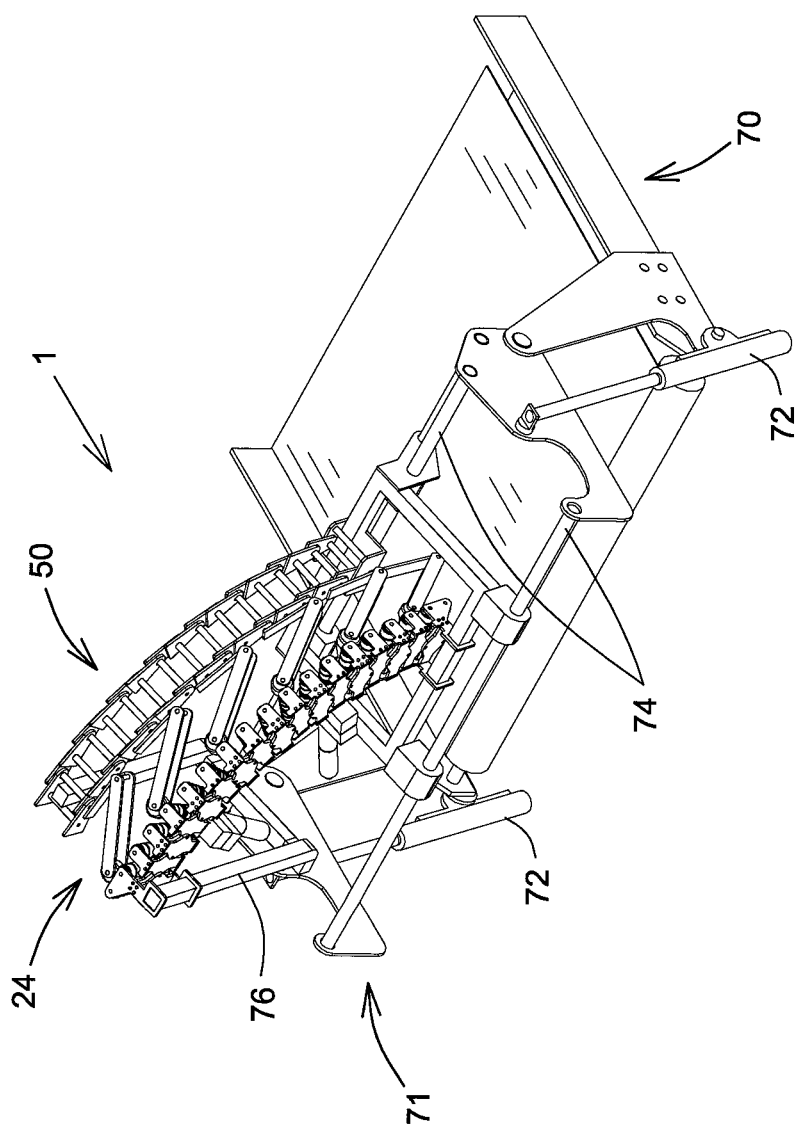

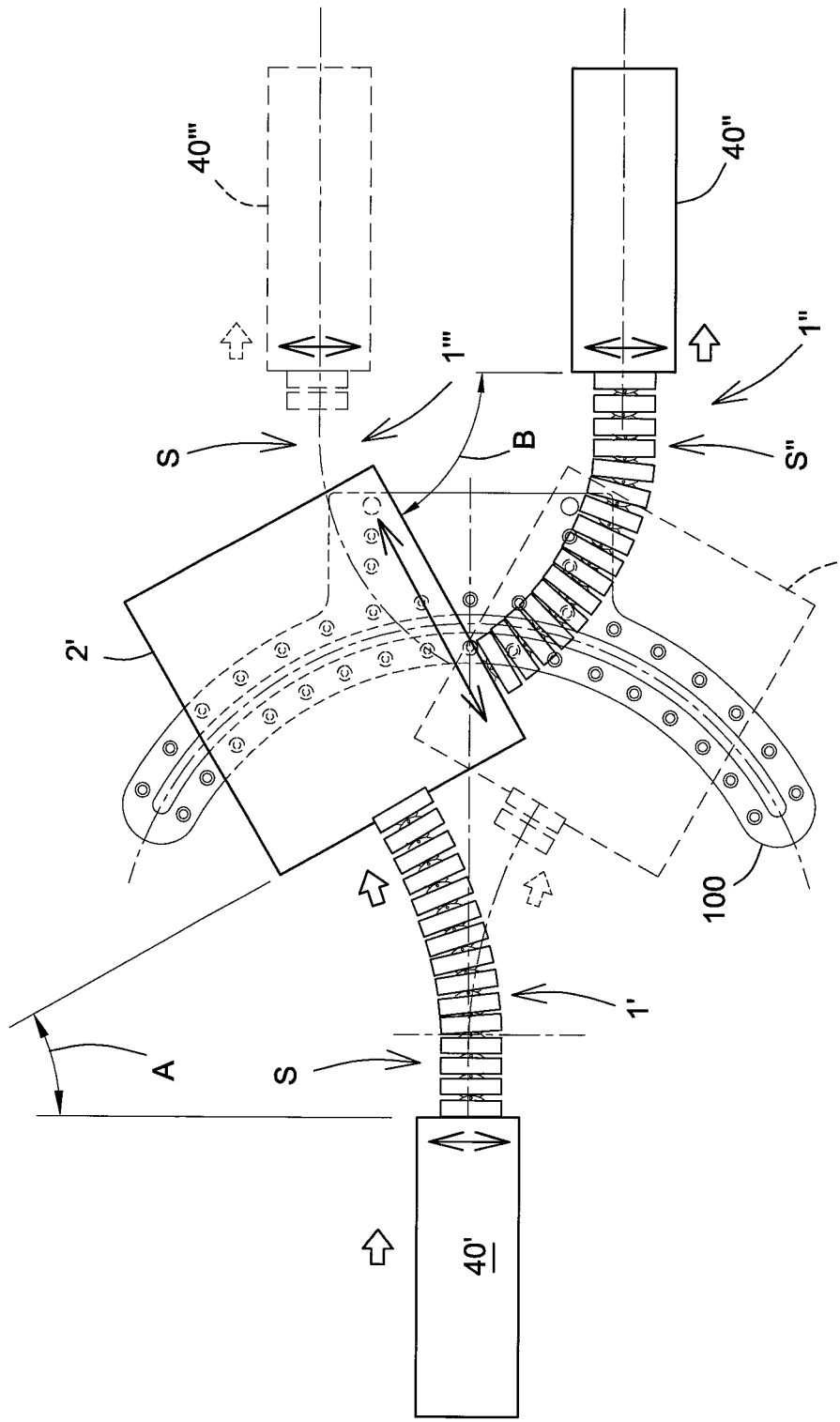

PACKAGE STREAM INDEXER DEVICE

CROSS-REFERENCE TO RELATED APPLICATIONS

This application is a national stage filing under Section 371 of International Patent Application No. PCT/CA2009/001003 filed on Jul. 14, 2009 and published in English as WO 2010/006437 A1 on Jan. 21, 2010, which International Patent application is a Continuation-in-part of U.S. patent application Ser. No. 12/216,942 filed on Jul. 14, 2008, now U.S. Pat. No. 7,967,124 issued Jun. 28, 2011.

FIELD OF THE INVENTION

The present invention relates to a package stream indexer device for use in a conveyor system deployed for the purpose of conveying a stream of folded cartons or packages within a package handling system.

In particular, the invention has reference to a package stream indexer device for transferring the stream packages from one station conveyor to at least one other station conveyor along a selected path.

BACKGROUND OF THE INVENTION

It is well known in the art to vary the direction of a stream (or shingle) of packages in the form of folded boxes, cartons, letters and the like while substantially keeping that stream in a same plane for further processing of the packages. Such changes of stream direction require the use of either a relatively complex and cumbersome curved belt conveyor having relatively large radius of curvature or a curved live roller conveyor having a series of adjacent tapered rollers to induce turning of the stream, or an amalgam of such conveyors, as exemplified in U.S. Pat. Nos. 3,610,404 and 7,150,352.

Although these curved conveyors suit their needs, they have a fixed direction of curving as well as a fixed curve angle, unless they are made of multiple successive removable sections each of fixed curve angle, which significantly increase the complexity, cost and maintenance of such conveyors. Such transfer mechanisms are generally static in terms of their siting and accordingly are of limited flexibility when alternative conveying arrays need to be adopted, thus requiring significant rearrangement of system elements.

Accordingly, there is a need for a package stream indexer device which obviates or significantly reduces the highlighted problem.

SUMMARY OF THE INVENTION

It is therefore a general object of the present invention to provide a package stream indexer device which solves the above-mentioned problems and meets the needs outlined above.

An advantage of the present invention is that the device is of relatively simple and yet effective construction which satisfies the arduous tasks to be undertaken in a package stream or shingle handling in a typically 90-degree curved path (or any other angle depending on the length of the indexer device) of relatively small radius within a same stream plane.

Another advantage of the present invention is that the package stream indexer device facilitates the reorientation of a conveying package stream in a versatile and novel manner, such as when the packages within a stream need to be reoriented relative to one another within the stream with a 90-degree rotation when the output stream conveyor of the device is oriented substantially parallel relative to the input stream conveyor, to essentially have an output stream flowing in a same direction as from the input stream.

A still further advantage of the present invention is that the device presents a low maintenance mechanism and is accordingly economic to install and to run.

Accordingly the invention provides a package stream indexer device for indexing a stream of packages being displaced thereon within a stream plane, characterized by a support section including a series of live rollers mounted on an articulated track defining a shaped package path having an articulation line substantially within the stream plane, the track being formed of a plurality of interconnected links frictionally engaged together and adapted for dynamic movement for the purpose of altering the orientation of the shaped package path, and an opposite package retainer mechanism being disposed adjacent and in spaced relation to the articulated track for keeping packages in abutment contact with the rollers within the stream plane.

Conveniently, the package retainer mechanism includes a pressure mechanism to ensure the packages remain in abutment contact with the rollers.

Typically, the articulated track is a first articulated track, and the package retainer mechanism includes a series of pressure wheels mounted on a second articulated track formed similarly to the first articulated track, the second articulated track complementing the first track in defining the shaped package path and also being adapted for dynamic movement for the purpose of assuming the orientation of the package path.

Conveniently, the first and second articulated tracks are lower and upper tracks, respectively.

The package stream indexer further consists of a displaceable output conveyor which may form part of a package handling and conveying system.

The package stream indexer is in practice supported in such manner as to enable appropriate alignment between a delivery conveyor and the displaceable output conveyor.

The links of the first and second articulated tracks taken individually are interconnected about an articulation axis generally perpendicular to the stream plane in such manner as to enable the tracks to be dynamically moved either manually or mechanically and to assume and maintain in a set condition the appropriate orientation of the package path in the absence of further activity.

The live rollers of the first track are suitably driven by for example belts reeved around the rollers, conveniently within grooves formed therein, and are rotatably mounted in the links in such a way as to allow the reorientation of the track without being impeded. The live rollers may advantageously be provided with friction bands to assist in use the conveyance of packages in contact therewith. At least one motor is provided to drive the rollers.

Each drive belt may be an elastic drive belt. The grooves are typically located adjacent the articulation line. Preferably, each roller includes a pair of grooves located adjacent to and on a respective side of the articulation line, and each groove of the pair receives a respective drive belt reeved therearound for connection with a respective one of preceding and succeeding adjacent rollers.

The pressure wheels of the second track may be mounted on pivotable arms attached in spaced manner along the length of said second track, the arms being adapted to pivot such as in use to bring the wheels into contact with the packages passing along the first track in order to maintain alignment of the packages on the track.

The links of both the first and second tracks are constructed to be frictionally and pivotally interconnected so as to provide one plane of movement as between each other and in use dynamic displacement of the tracks occasions movement of the links from one set position to another reoriented and set placement. The tracks are suitably supported in the chosen position by brackets or the like which affix to a standing structure, for example the support framework of a conveyor or to rails that are provided on such a framework for this purpose. Both tracks are hinged to allow them to be parked in a non-operational position and also to be moved into an operational position.

Twin indexer devices may be deployed when it is desired to effect directional indexing from one delivery conveyor to reach a specific reception conveyor or even alternate between receiving conveyors. In this instance an intermediate conveyor would be employed with appropriate means for effecting movement thereof to effect the correct orientation thereof for delivery onto the pre-selected receiving conveyor.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, characterized in that:

FIG. 6a is a perspective view corresponding to that shown in FIG. 6 with the device in a non-operational mode;

FIG. 7 is a simplified plan view of a different arrangement of the device shown in FIG. 1.

DETAILED DESCRIPTION OF THE PREFERRED EMBODIMENTS

With reference to the annexed drawings the preferred embodiment of the present invention will be herein described for indicative purpose and by no means as of limitation.

Figure 1:
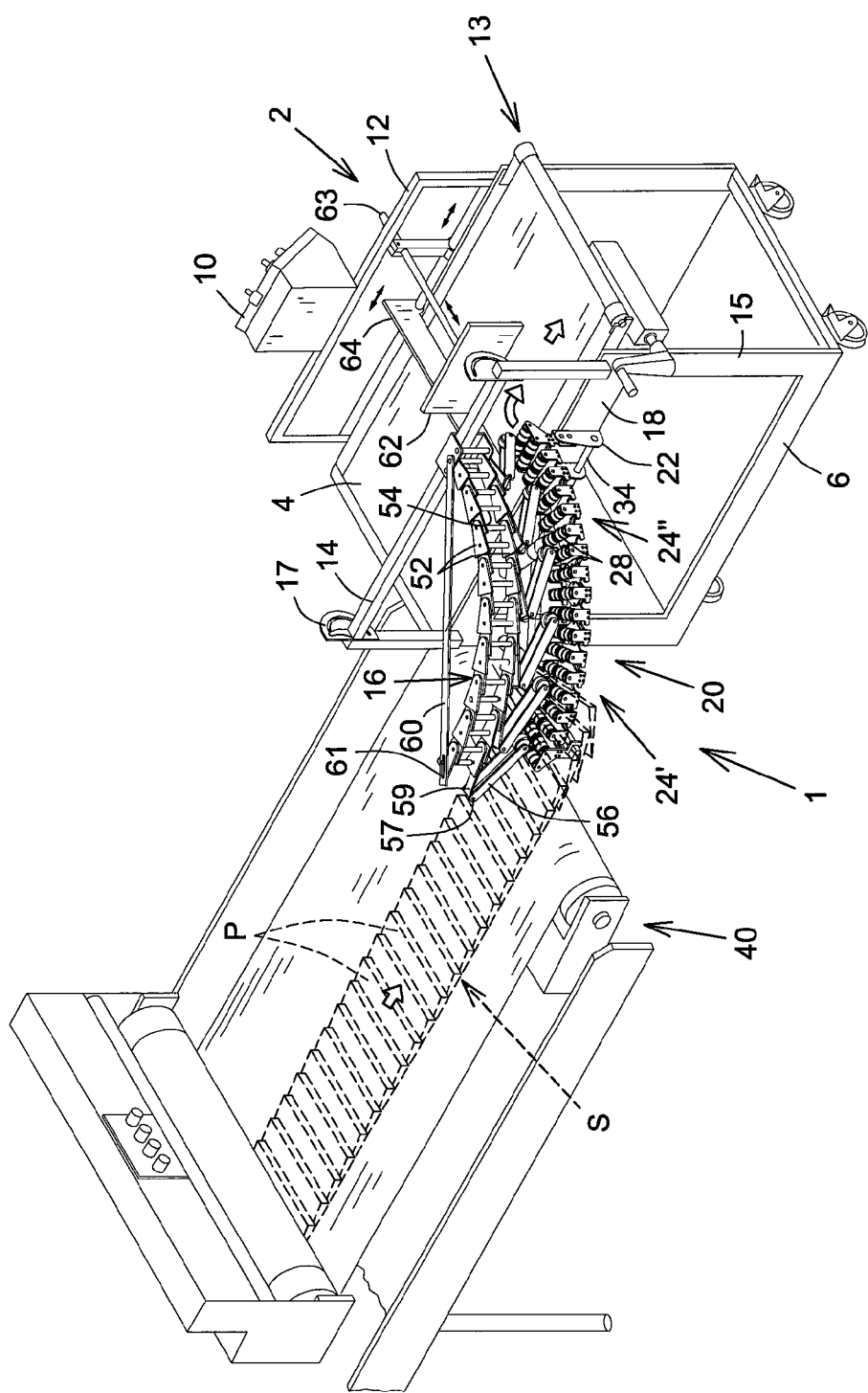
FIG. 1 is a perspective view or a package stream indexer device according to a first embodiment of the present invention mounted in association with a displaceable output conveyor.
Figure 2:
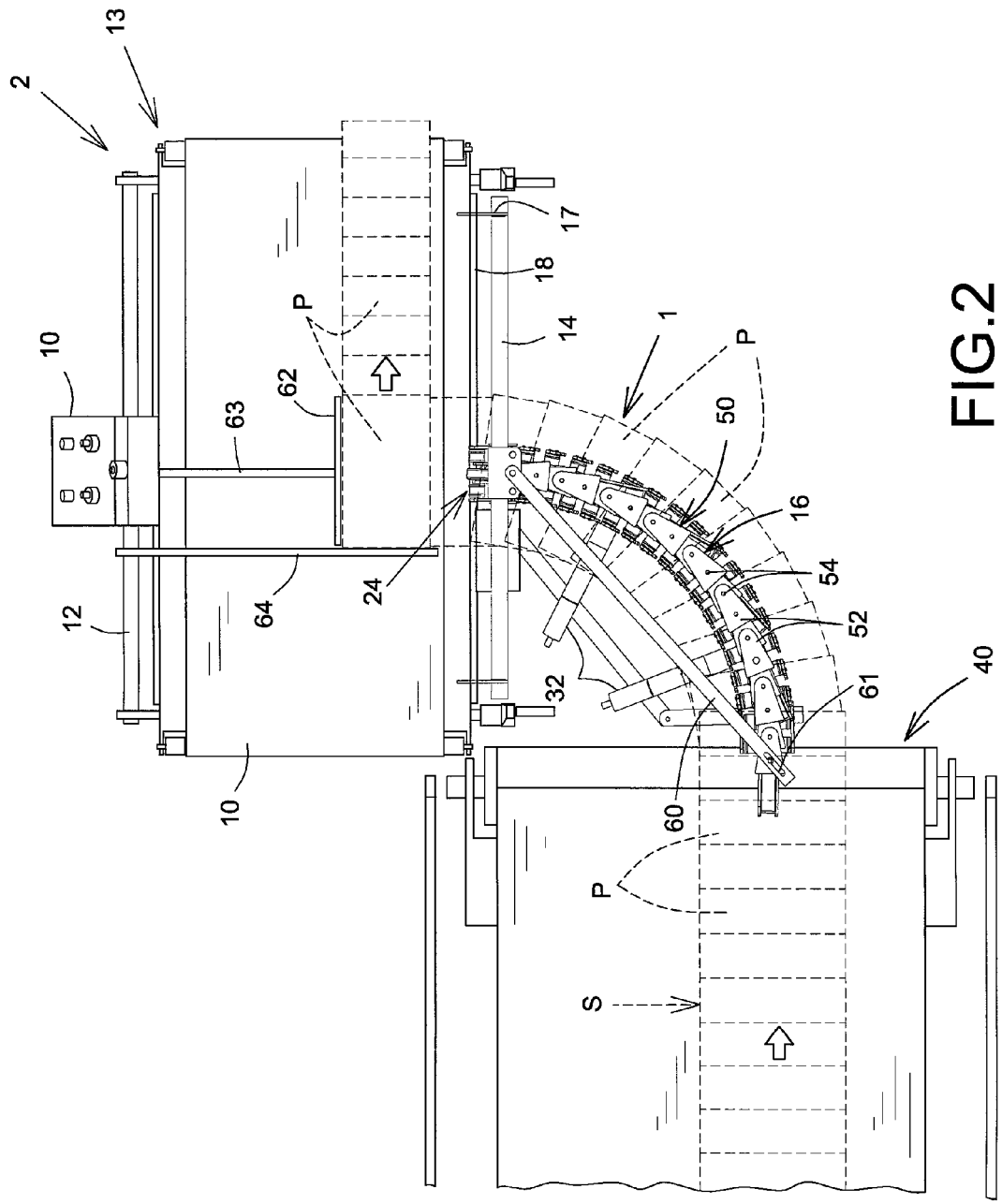
FIG. 2 is a plan view or the device shown in FIG. 1.
Figure 3:
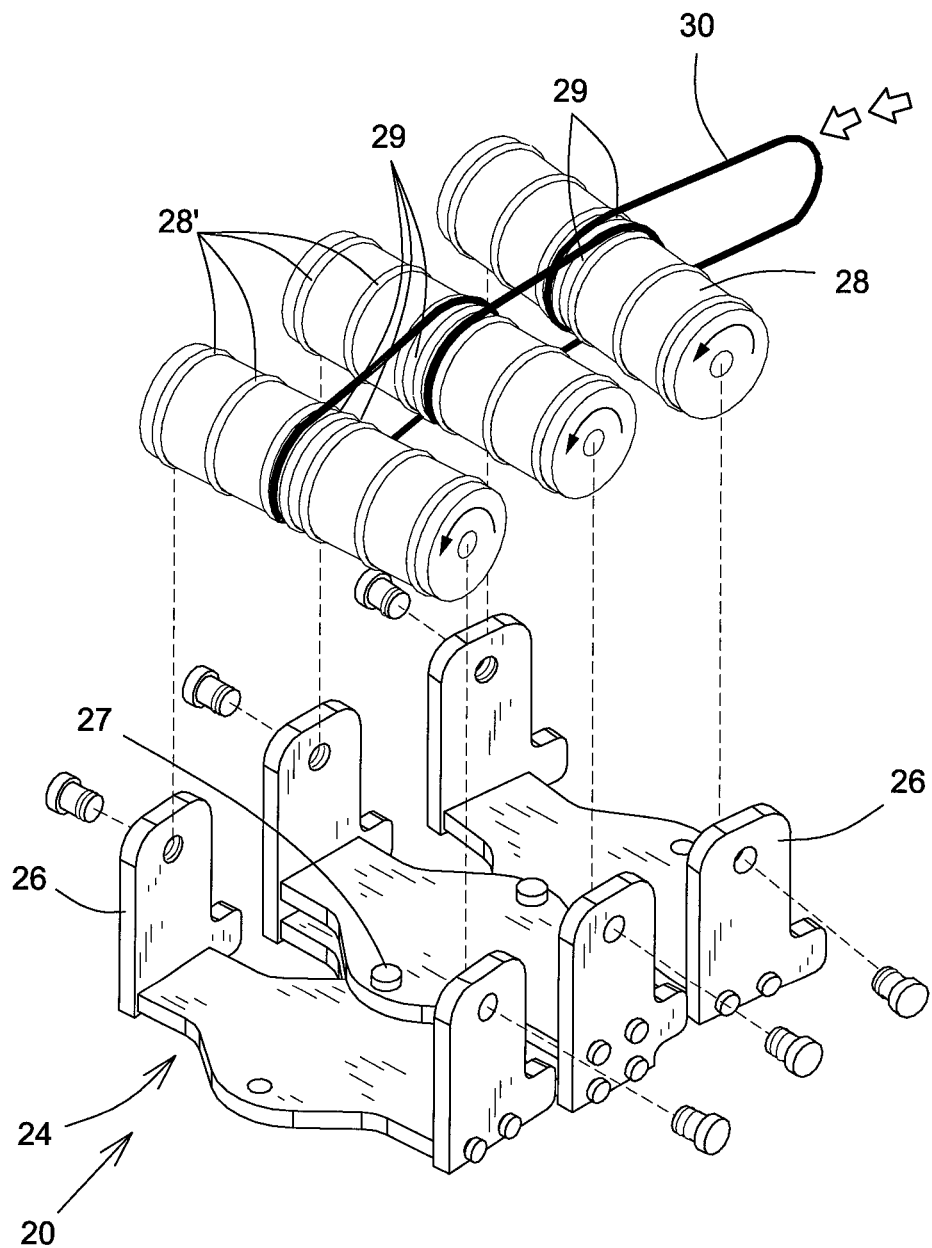
FIG. 3 is a perspective view of a detail partially exploded of the device illustrated in the previous figures.
Figure 4:
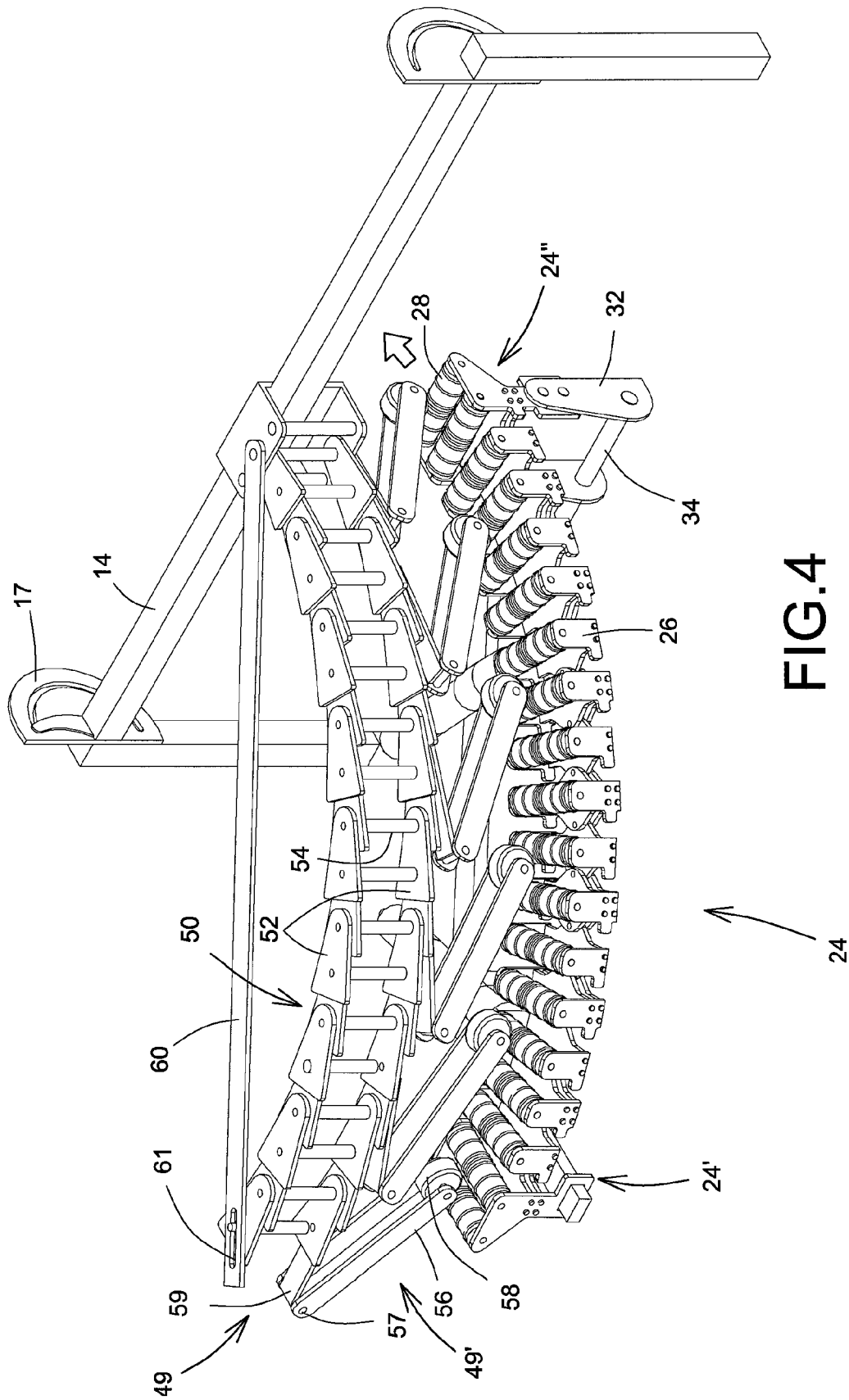
FIG. 4 is a close-up view of the device shown in FIGS. 1 and 2.

Referring to the drawings, there is illustrated generally at 1 a package stream indexer device, for indexing a stream S of packages P partially shown in dotted lines in FIGS. 1 and 2 substantially within a stream plane defined by the incoming stream, mounted on a displaceable output conveyor machine 2 incorporating a belt conveyor 4, the conveyor 4 and the device 1 being supported on and by a mobile base unit 6, which is adjustable in height. A control console 10 is affixed to a front rail 12 provided at the front side 13 of the unit 6 adjacent a front margin of the conveyor 4, which runs longitudinally of the base unit 6.

On the opposite rear side 15 of the unit 6 there is formed thereon a rear support rail 14 incorporating a 90° pivot mounting 17 for a relatively upper part 16 of the device 1. The opposite side of the unit 6 also provides at substantially the level of the conveyor 4 a support beam 18 for a relatively lower part 20 of the device 1, the beam including a 90° pivot mechanism 22 for the lower part 20.

The relatively lower part 20 of the device 1 includes a first articulated track 24 comprising a plurality of links 26 frictionally interconnected one with the other in series by pivot bolts 27 about respective articulation axis generally perpendicular to the stream plane. The links 26, which define an articulation line, allow dynamic movement upon application of pressure and maintain the track 24 in any selected and set position once so placed, although the preferred two positions are the two extreme ones, namely 90 degrees in each direction, provided with abutment stoppers (not shown) to ensure proper orientation of the track 24. Each link 26 provides a cradle for a grooved live roller 28 provided with friction bands 28', typically elastic drive belts 30 being reeved serially over adjacent preceding and succeeding rollers 28 in the grooves 29 provided therefore and located adjacent the articulation line and typically on either side thereof. The rollers 28 are driven by motors 32 located on the track 24 and coupled to rollers 28 at spaced apart locations on the track or other locations. The motors may be of any appropriate type, but may typically be electric.

The first track 24 has a receiving end 24' and a delivery end 24", the receiving end 24' being in use located adjacent the delivery end of an input belt conveyor 40 and the delivery end 24" being disposed adjacent the rear side 15 of the base unit 6 adjacent the rear side of the conveyor 4. The track 24 is hinged at 34 to the rear side 15 of the unit 6 and is shown in FIGS. 1, 2, 4, 5 and 6 in an operational position extending outwardly from the unit 6. It may be moved into a non-operational position adjacent the rear side 15 of the unit 6 by pivoting on the hinge 34. Restitution to the operational position may be achieved by a hydraulic ram 72 (see FIGS. 6 and 6a, but not shown in the other figures).

The relatively upper part 16 of the device 1 comprises a package retainer mechanism 49 (see FIG. 4), typically in the form of a second articulated track 50 including a series of links 52 frictionally interconnected by pivot pins 54 which allow dynamic movement upon the application of force to pivot about the articulation axes of the pins generally perpendicular to the stream plane but which set the track into the orientation chosen. Depending from the track 50 is a pressure mechanism 49', typically in the form of a series of arms 56 on the ends of which are rotatably mounted a series of pressure wheels 58, the pressure typically being provided by the respective weight of each wheel, the arms being freely pivoted as at 57 to respective support bars 59 attached directly to and extending from the links 52 of the track 50 as shown. The track 50 is mounted on the support rail 14 which has the pivot mounting 13 at each end of the rail this permitting a 90° rotational movement of the whole track within the stream plane. A support arm 60 extends from the rail 14 and in use supports the track 50 in its set selected position. The support arm 60 is typically provided with a slot hole 61 to allow re-orientation of the upper track 50 without disassembly thereof.

Although not illustrated herein, other types of package retainer mechanism, such as a top plate or pads maintained spaced above the rollers, could be considered without departing from the scope of the present invention.

The displaceable output conveyor machine 2 is supported by the base unit 6 which is provided with a side guide 62 in the form of a plate mounted on a rod 63, the position of the guide 62 being variable across the belt conveyor 4 always in register with the delivery end 24" as shown. The machine 2 further has a directional guide 64 which is associated with the delivery end 24" of the first track 24 and the side guide 62 such that in practice conveyed packages take the appropriate path. The directional guide 64 may be placed on either one side or the other of the side guide 62 so that the indexer feed may be directed in either direction, namely to the right or to the left of the delivery end 24", depending on which side is located the machine 2 relative to the input belt conveyor 40.

Figure 5:
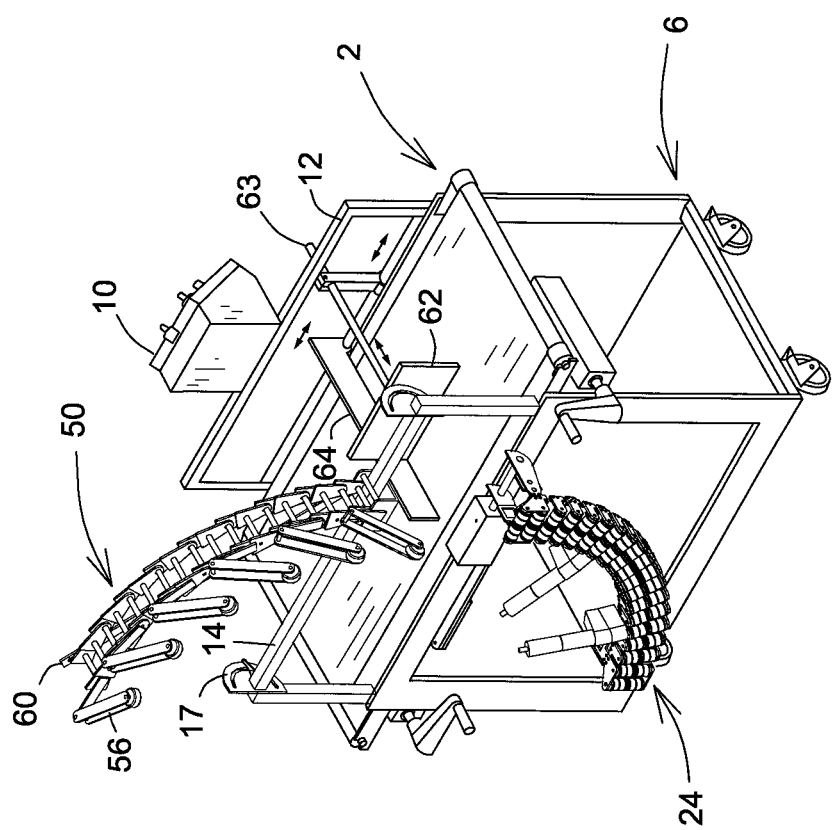
FIG. 5 is a perspective view of the device in parked mode on the conveyor shown in FIGS. 1 and 2.

In operation, the package stream indexer 1 is disposed adjacent the delivery end of the belt conveyor 40. FIG. 5 illustrates the indexer in a non-operational mode with the tracks 24 and 50 vertically parked adjacent the rear side 15 of the base unit 6. In order to bring the indexer into operational mode extending substantially horizontally from the base unit, the first track 24 is moved into position in relation thereto with its receiving end 24' in feed communication with the delivery end of the conveyor 40. The links 26 are moved for this purpose and pivot about the pins 27 to be set by frictional forces in the selected position, typically into either one of the two extremes 90-degree curves. The receiving end 24' is then fixed in that position by means of a bracket (not shown) and is locked at its delivery end 24" at the hinge 34 to prevent any inadvertent movement.

The second track 50 is then oriented into a similar position over the first track 24, the idler wheels 58 moving into a contact mode by the pivoting of the arms 56 about their pivots 57.

The side guide 62 and the guide 64 are then disposed over the conveyor 4 to provide the appropriate feed path for packages discharged from the track 24.

The live rollers 28 are powered up by motors 32 and the conveyor 4 is started and packages P being conveyed by conveyor 40 are delivered to the track 24 where they continue to be conveyed within the stream plane, being held in contact with the track by the pressure wheels 58. Any variation in the dimension of the packages is accommodated by the wheels 58 which are gravity loaded. The packages P are delivered onto the conveyor 4 whence they are transported to the right as illustrated, after being thence rotated 90 degrees relative to each other along the output stream, relative to their relative position in the input stream. Any desired change in the directional stream path induced by the indexer device 1, left (see FIGS. 1 and 2) or right (see FIG. 6), is easily accommodated on the conveyor 4 by altering the positioning of the side guide 62 and the directional guide 64.

If it becomes necessary to change the orientation of the indexer for strategic or practical reasons, the disposition of the tracks 24 and 50 are altered merely by dynamic movement into a fresh set position to secure the desired flow stream.

Figure 6:
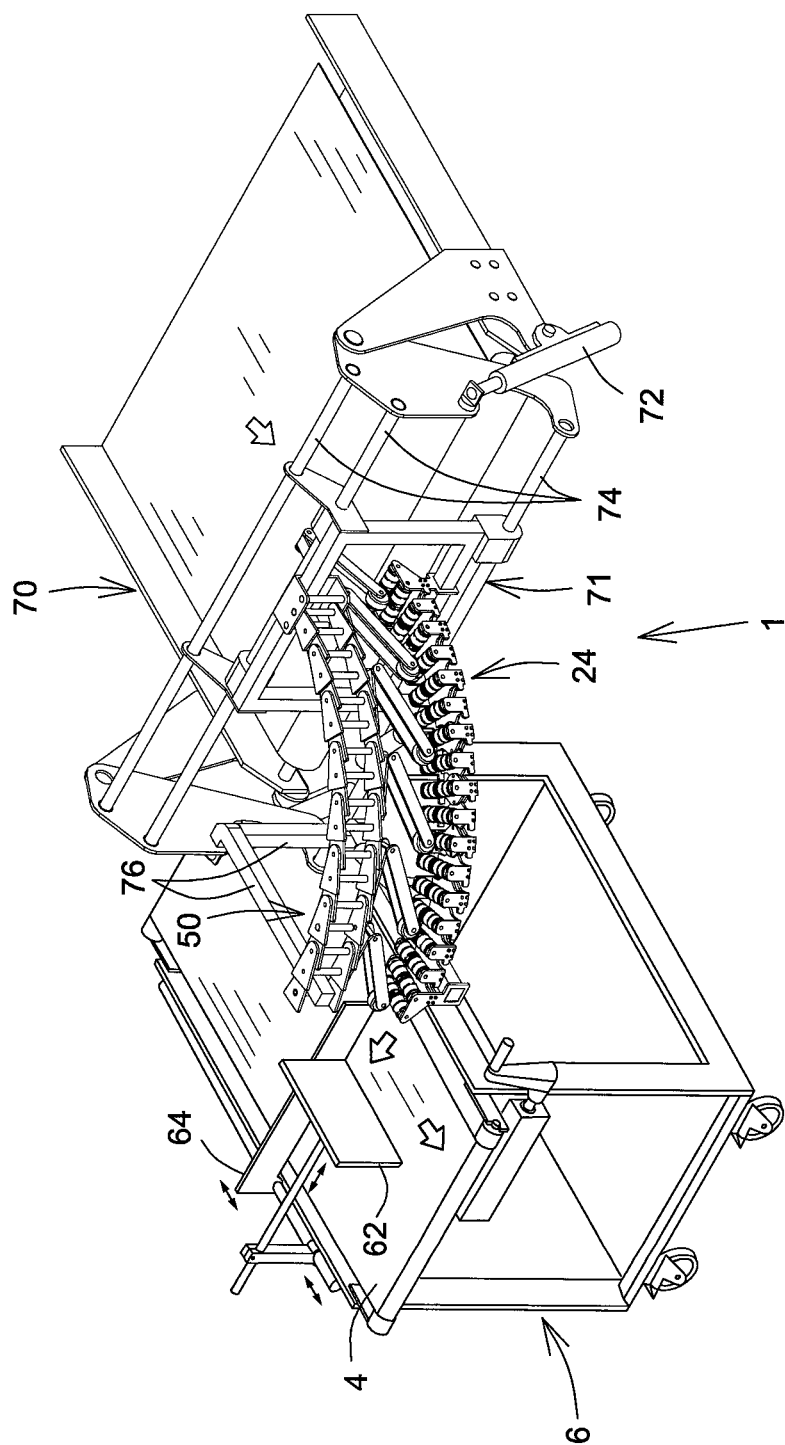
FIG. 6 is a perspective view of a second embodiment of the device shown mounted in an operational mode on an input delivery conveyor.

FIG. 6 illustrates the package stream indexer in position adjacent the delivery end conveyor 70 of a folder-gluer machine, with the tracks 24 and 50 being mounted on a support structure 71 fixed to the end of that conveyor. A hydraulic ram 72 is provided to move the tracks to and from the operational position shown in FIG. 6 into a non-operation parked mode illustrated in FIG. 6*a*, whenever required. The support structure 71 has guide rails 74 on which the tracks 24 and 50 are mounted in sliding manner in order to allow lateral or transversal positional adjustment therealong, typically using a worm screw mechanism or the like (not shown). The free ends of the two tracks 24, 50 are typically releasably secured to the support structure 71 with a C-shape support frame 76.

The versatility of the articulated tracks facilitates machinery set-up in a package stream (shingle) handling plant and enables adjustment of positioning in the absence of complicated and time-consuming movement of plant elements.

Figure 8:
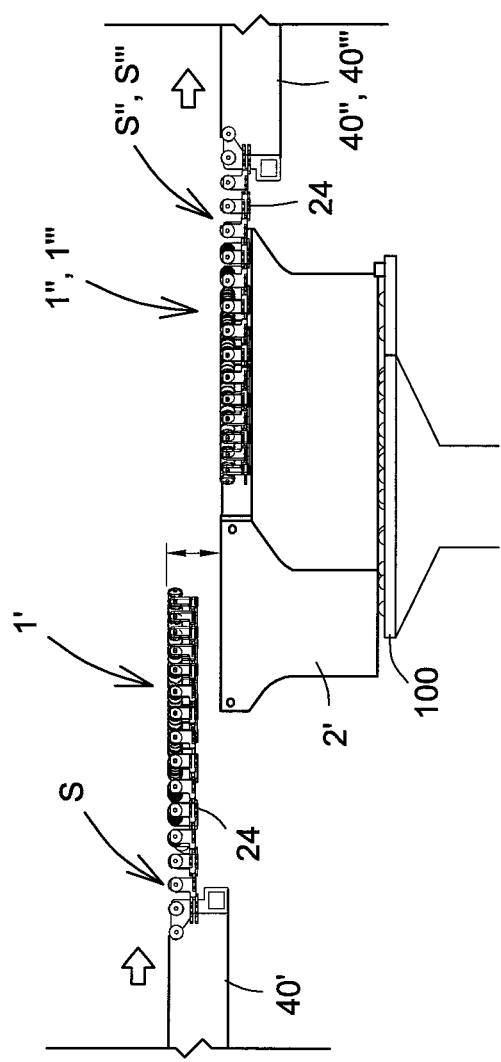
FIG. 8 is a simplified side view of the arrangement of FIG. 7.

To this end, as shown in FIGS. 7 and 8, there is provided an alternative arrangement of diverting a stream S of packages (not specifically shown) from one conveyor to another. In particular, there is illustrated an input conveyor 40' being an output of a package handling machine (such as a folder-gluer machine or the like) carrying packages for delivery onto an intermediate conveyor 2' (schematically shown without guides and the like) which is mounted on an arcuate guide 100 allowing the conveyor to be moved there along to index the stream S from the conveyor 40' to a reception conveyor 40" or 40''' (of an input of a package handling machine or the like) oriented parallel to but downstream of conveyor 40' depending on the desired direction and path. The packages are directed to the reception conveyor by the use of indexing mechanisms 1', 1" or 1''' of a similar character to those described supra allowing the packages to follow the desired path to the relevant conveyor 40" or 40''' position.

In the drawing of FIGS. 7 and 8 the continuous lines show the first defined path for the stream S, S" with packages being transferred to the left from the conveyor 40' to the conveyor 40" at a first position using a package stream indexer device 1". The lines in dotted outline in these two figures represent an alternate defined path of stream S, S''' to the right leading from the conveyor 40' to the conveyor 40''' at a different position. The intermediate conveyor 2' is moved from one position on its arcuate guide 100 from one end thereof to the other, such movement being effected by any suitable means (not shown). Furthermore, due to the flexibility of the arrangement, although not shown in FIG. 7, it is possible to align the package stream of the input conveyor 40' and either one of the reception conveyor 40", 40''' positions. Typically, such an arrangement using two indexing mechanisms 1' and 1" or 1''' has multiple areas of flexibility. First, the stream angles A, B, adding to about 90°, may vary, such as to be about 30° and about 60° respectively (as shown in FIG. 7), or inversely 60° and 30°, or even both at 45°. Second, the intake position of the first indexing mechanism 1' is typically laterally adjustable by about 15 cm (6 inches) at the input conveyor 40', and the intake position of the second indexing mechanism 1", 1''' is typically laterally adjustable by about 60 cm (2 feet) at the intermediate conveyor 2', as shown by the respective two-way arrows in FIG. 7. The output position of the second indexing mechanism 1", 1''' is also typically laterally adjustable by about 15 cm (6 inches) at the reception conveyor 40", 40''', while the output position of the first indexing mechanism 1' is typically fixed relative to the intermediate conveyor 2', typically at the center thereof. These adjustments are helpful to set the proper arrangement depending on the dimensions of the packages.

Although not specifically shown, the second indexing mechanism 1" or 1''' may be followed by an extensible conveyor to cover for any possible gap created between the input 40' and output (40" or 40''') conveyors depending on the specific arrangement (angles A, B), the distance between the two conveyors being generally fixed.

From the reading of the above description, it would be obvious to one skilled in the art that the package stream S, could have either all the successive packages touching the adjacent ones (as shown in FIGS. 1 and 2), or have all the successive packages being separated from the adjacent ones (therefore circulating into a one-by-one configuration), without departing from the scope of the present invention.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

The invention claimed is:

1. A package stream indexer device for indexing a stream of packages along first and second portion paths thereof with displacement thereon within respective first and second stream planes being substantially parallel to one another, said device comprising first and second indexing mechanisms mounting on a movable intermediate conveyor and including a respective series of live rollers mounted on first and second articulated tracks each track defining a shaped package path having an articulation line substantially within the corresponding stream plane each said first and second track being formed of a plurality of interconnected links frictionally engaged together and adapted for dynamic movement for the purpose of altering the orientation of the respective shaped package path, for each said indexing mechanisms, each said link of the plurality of links pivotally interconnecting to an adjacent said link about an articulation axis generally perpendicular to the corresponding stream plane, opposite respective first and second package retainer mechanisms mounted on the intermediate conveyor and being disposed adjacent and in spaced relation to the first and second articulated tracks, respectively, in a direction perpendicular to the corresponding stream plane for keeping packages in abutment contact with the corresponding rollers within the stream plane, the first and second articulated tracks respectively registering upstream and downstream of the moveable intermediate conveyor, the intermediate conveyor bridging an input conveyor and a reception conveyor with the respective indexing mechanisms being positionable to establish the requisite first and second stream paths.

2. A package stream indexer according to claim 1 wherein the moveable intermediate conveyor is mounted on an arcuate guide and is adapted for movement therealong.

3. A package stream indexer according to claim 1 wherein the input conveyor and the reception conveyor are substantially oriented in parallel relative to one another.

4. A package stream indexer according to claim 1 wherein the first and second articulated tracks register with the moveable intermediate conveyor with an angle of about 90 degrees relative to one.

5. A package, stream indexer according to claim 4 wherein the first and second indexing mechanisms are respectively laterally adjustable relative to the input conveyor and to the intermediate conveyor, within the respective stream planes.

6. A package stream indexer according to claim 5 wherein the first indexing mechanism is substantially fixed relative to the intermediate conveyor, within the first stream plane.

7. A package stream indexer according to claim 6 wherein the second indexing mechanism is laterally adjustable relative to the reception conveyor, within the second stream plane.

8. A package stream indexer according to claim 1 wherein each said package retainer mechanism includes a pressure mechanism to ensure the packages P remain in abutment contact with the corresponding rollers.

9. A package stream indexer according to claim 8 wherein each said package retainer mechanism includes a series of pressure wheels mounted on a lower articulated tracks formed similarly to the corresponding first and second articulated tracks, the lower articulated track complementing said corresponding first and second tracks in defining the corresponding shaped first and second package paths and also being adapted for dynamic movement for the purpose of assuming the orientation of the corresponding said package path.

* * * * *